Figure 1:
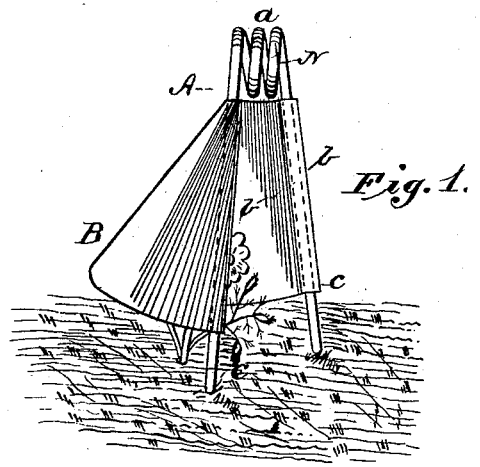

(No Model.)

C. M. YARBOROUGH.
PLANT PROTECTOR.

No. 409,133. Patented Aug. 13, 1889.

Witnesses
M. B. Harris
W. F. Gardner

Inventor
Cora M. Yarborough
by J. J. Johnston
Attorney

UNITED STATES PATENT OFFICE.

CORA MONTROSE YARBOROUGH, OF DURHAM, NORTH CAROLINA, ASSIGNOR TO JAMES H. LYNNE, OF SAME PLACE.

PLANT-PROTECTOR.

SPECIFICATION forming part of Letters Patent No. 409,133, dated August 13, 1889.

Application filed February 25, 1889. Serial No. 301,109. (No model.)

*To all whom it may concern:*

Be it known that I, CORA MONTROSE YARBOROUGH, a citizen of the United States, residing at Durham, in the county of Durham and State of North Carolina, have invented certain new and useful Improvements in Plant-Protectors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in plant-protectors; and it consists in certain details of construction and arrangement of parts hereinafter more specifically described in the specification, illustrated in the drawings, and pointed out in the claims.

Figure 2:
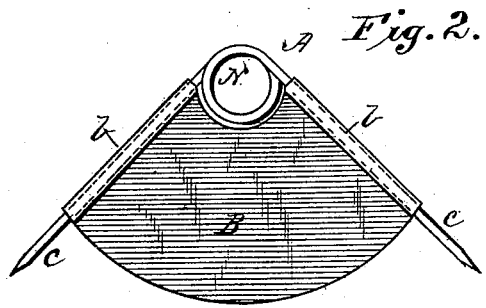
Figure 3:
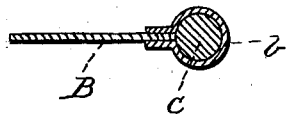

In the drawings, Figure 1 is a perspective view of my plant-protector as it appears in use. Fig. 2 is a front elevation of same when not in use. Fig. 3 is a detail sectional view on the line $x\ x$, Fig. 2, of one of the holding-jaws secured to an arm of the frame.

The object of my invention is to provide a simple and cheap device for the protection of young and growing plants from severe winds and extremes of heat and cold, and to render the same adjustable, so that it may be made to afford varying degrees of protection, as the circumstances may require. In accomplishing this result I provide a shield to be placed between the plant and the rays of the sun or the direction of the wind. This shield is in the form of the segment of a circle, made of any thin elastic material—such as pasteboard, wood, tin, oil-cloth, &c.—and capable of being bent so as to partially or nearly surround the plant, as shown in Fig. 1. This shield has its radial edges secured to a spring-frame having pointed legs projecting beyond the edges of the shield, to be inserted into the ground.

Referring to the drawings by letter, A is the spring-frame, having the coil $a$ at its center, and $b$ is a narrow strip of tin folded inward over the arms of the frame and soldered or otherwise secured thereto for the purpose of affording holding-jaws for the radial edges of the shield, which are inserted between.

B is the segmental shield, having its radial edges inserted between the jaws formed by the strip $b$. $c$ are the points or extremities of the legs, sharpened to enter the ground. When in use, the points $c$ are inserted into the ground on each side of the plant sufficiently close to cause the shield B to surround or partially inclose it, as shown in Fig. 1. When not in use, the elasticity of the frame, it being formed of spring-wire, causes the shield to resume its normal or flat shape.

In plant-protectors heretofore employed it has been usual to so construct the shield as to entirely surround or inclose the plant. Such construction is objectionable in that it operates to exclude the light to an injurious degree from the plant. Moreover, the shield is incapable of adjustment, so as to admit a greater or less degree of light, whereas by my construction one, two, or three sides may be inclosed, as deemed desirable, without materially interfering with the degree of light or heat required by the growing plant, but at the same time affording it protection from the direct rays of the sun or from cold winds. Half-hardy plants may be thus protected during an entire winter by increasing the size of the protector or employing two or more.

In some instances it is desirable to shield the plant from cold winds without excluding the sun's rays. In such cases the shield may be composed of mica or other substance which is elastic and transparent or partially transparent.

In the case of half-hardy plants that require more or less protection during the entire winter the shield may be made transparent or semi-transparent, and two or more protectors may be employed in order to entirely surround the plant and shield it from the cold winds, while at the same time admitting the requisite amount of light required by the plant.

N is a coil formed at the top or apex of the frame, which serves as a loop and enables the protector to be suspended from a nail or hook when not in use.

As these protectors, when not in use, are caused by the elasticity of the frame to assume a flat shape, it is obvious that a number of them may be packed closely together and suspended in bunches or bundles from a single hook.

Having thus described my invention, what I claim, and desire to secure by Letters Patent, is—

1. In a plant-protector, the combination, with a two-sided metallic spring-frame provided on its opposite sides or arms with inwardly-facing holding-jaws, of a segmental shield having its opposite edges secured between the holding-jaws, substantially as described.

2. The combination, in a plant-protector, of the two-sided metallic spring-frame, the inwardly-facing jaws secured to the opposite sides of the frame, and the pliable or elastic shield secured between the jaws within the frame, substantially as and for the purpose described.

In testimony whereof I affix my signature in presence of two witnesses.

CORA MONTROSE YARBOROUGH.

Witnesses:
W. J. HOLLOWAY.
LEO D. HEARTT.